(12) United States Patent
Miyazaki

(10) Patent No.: US 11,150,454 B2
(45) Date of Patent: Oct. 19, 2021

(54) MICROSCOPE PUPIL RELAY OPTICAL SYSTEM AND MICROSCOPE DEVICE

(71) Applicant: OLYMPUS CORPORATION, Hachioji (JP)

(72) Inventor: Kanto Miyazaki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 392 days.

(21) Appl. No.: 16/224,077

(22) Filed: Dec. 18, 2018

(65) Prior Publication Data

US 2019/0121110 A1  Apr. 25, 2019

Related U.S. Application Data

(63) Continuation of application No. PCT/JP2016/068440, filed on Jun. 21, 2016.

(51) Int. Cl.
| | |
|---|---|
| *G02B 21/02* | (2006.01) |
| *G02B 21/00* | (2006.01) |
| *G02B 13/00* | (2006.01) |

(52) U.S. Cl.
CPC ............ *G02B 21/02* (2013.01); *G02B 13/00* (2013.01); *G02B 21/00* (2013.01)

(58) Field of Classification Search
CPC ........ G02B 21/00; G02B 21/02; G02B 21/36; G02B 21/361; G02B 13/00; G02B 13/0095
See application file for complete search history.

(56) References Cited

U.S. PATENT DOCUMENTS

| | | | |
|---|---|---|---|
| 4,769,530 A | 9/1988 | Miyahara | |
| 5,729,385 A * | 3/1998 | Nishida | ............ G02B 13/0095 359/368 |

(Continued)

FOREIGN PATENT DOCUMENTS

| | | |
|---|---|---|
| EP | 1372015 A2 | 12/2003 |
| JP | H08015612 A | 1/1996 |

(Continued)

OTHER PUBLICATIONS

International Search Report (ISR) dated Aug. 16, 2016 issued in International Application No. PCT/JP2016/068440.

(Continued)

*Primary Examiner* — Stephone B Allen
*Assistant Examiner* — Adam W Booher
(74) *Attorney, Agent, or Firm* — Holtz, Holtz & Volek PC

(57) ABSTRACT

With the aim of shortening the entire length and configuring an entire upright microscope compactly even if coded aperture technology and light field technology are applied thereto, a microscope pupil relay optical system is disposed on an image side of a microscope image-forming optical system including an objective lens, and includes, in the following order from an object side, a first lens group that has a positive refractive power and to which a convergent light flux is introduced from the object side; and a second lens group that has a positive refractive power. A lens located closest to the object-side end of the first lens group is disposed on the object side than a primary image-forming plane on which the microscope image-forming optical system forms an object image, and an exit pupil of the objective lens is re-formed at a position optically conjugate with the exit pupil.

4 Claims, 15 Drawing Sheets

(56) References Cited

U.S. PATENT DOCUMENTS

| | | |
|---|---|---|
| 5,808,791 A | 9/1998 | Kawano et al. |
| 6,323,998 B1 | 11/2001 | Kawano et al. |
| 2003/0233028 A1 | 12/2003 | Tokuda et al. |
| 2008/0174861 A1 | 7/2008 | Uzawa et al. |
| 2010/0020391 A1 | 1/2010 | Kawasaki |

FOREIGN PATENT DOCUMENTS

| | | |
|---|---|---|
| JP | 2614843 B2 | 5/1997 |
| JP | 2001147383 A | 5/2001 |
| JP | 2004070278 A | 3/2004 |
| JP | 2008170803 A | 7/2008 |
| JP | 2009122624 A | 6/2009 |
| JP | 2009198955 A | 9/2009 |
| JP | 2010032622 A | 2/2010 |
| JP | 2012200282 A | 10/2012 |

OTHER PUBLICATIONS

Written Opinion dated Aug. 16, 2016 issued in International Application No. PCT/JP2016/068440.

Noy Cohen, et al., "Enhancing the performance of the light field microscope using wavefront coding," Optics Express, vol. 22, No. 20, Oct. 6, 2014, pp. 24817-24839.

* cited by examiner

SPHERICAL ABERRATION (mm)

ASTIGMATISM (mm)

MICROSCOPE PUPIL RELAY OPTICAL SYSTEM AND MICROSCOPE DEVICE

CROSS-REFERENCE TO RELATED APPLICATIONS

This is a continuation of International Application PCT/JP2016/068440, with an international filing date of Jun. 21, 2016, which is hereby incorporated by reference herein in its entirety.

TECHNICAL FIELD

The present invention relates to microscope pupil relay optical systems and microscope devices.

BACKGROUND ART

In what is called light field technology, a lens array is disposed in an image plane of a lens, and information about the direction of light flux is acquired simultaneously with an image. The primary application of this technology has hitherto been photographic lenses, but application to microscopes has recently begun. By applying light field technology to a microscope, it becomes possible to acquire three-dimensional information about a microscale observation target with a single shot.

It is possible to acquire three-dimensional information about a microscale observation target by using, for example, a confocal microscope. In this case, however, it is necessary to repeatedly capture sectional videos one by one and to then render three-dimensional information therefrom, it takes a great amount of time to finally acquire three-dimensional information. In contrast, with light field technology, it is possible to acquire three-dimensional information in a short time, and thus the application thereof to microscopes has been recently drawing interest.

Efforts are also being made to improve the functionality of microscopes by combining light field technology with coded aperture technology (e.g., see Noy Cohen, Samuel Yang, Aaron Andalman, Michael Broxton, Logan Grosenick, Karl Deisseroth, Mark Horowitz, and Marc Levoy, "Enhancing the performance of the light field microscope using wavefront coding", Opt. Express 22, 24817-24839 (2014)).

In this technology, a spatial filter, such as a phase mask having a specific pattern, is disposed at the pupil of an optical system, and acquired image signals are processed by using a computer, with the aim of improving the horizontal resolution of three-dimensional information.

In order to acquire a light field image, a microlens array is disposed in an image plane, and an imaging element is disposed on the posterior side thereof. Generally, an image of the exit pupil of the objective lens of the microscope is formed on the light-receiving face of the imaging element via microlenses. Thus, the pixel of the imaging element on which the light flux is incident on the objective lens is determined depending on the direction of the light flux, which makes it possible to acquire information about the light beam direction.

As shown in FIGS. 3A and 3B, the number of pixels corresponding to each of the microlenses is usually n×m, and an image of the pupil is formed within a region of that number of pixels. In order to attain this relationship over the entire screen, it is necessary that the light beam that passed through the center of the exit pupil of the objective lens, i.e., the primary light beam, be parallel to the optical axis, i.e., image-side telecentricity.

In the case where the coded aperture technology described above is applied, since a phase filter or the like is disposed at the pupil, it is usually necessary with the optical layout to tentatively form, in free space, an image of the exit pupil of the objective lens existing inside the lens.

Specifically, the following components are provided in this order from the object side:
(1) Object lens
(2) Relay optical system that forms an image of the exit pupil of the objective lens
(3) Image-forming lens There is a known type of inverted microscope in which the exit pupil of the objective lens is taken out of the objective lens by using a relay optical system and in which a space for installing a pupil-modulating filter such as a phase difference film is provided at the conjugate point of the exit pupil (e.g., see Japanese Unexamined Patent Application, Publication No. Hei 8-15612 and Japanese Unexamined Patent Application, Publication No. 2009-122624).

As another example, there are a known type of observation device and method in which an object having light-scattering properties, such as a living body, is irradiated with illumination light and scattered light at the back thereof is measured to observe an observation target that may be present inside the object (e.g., see Japanese Unexamined Patent Application, Publication No. 2001-147383, Japanese Unexamined Patent Application, Publication No. 2004-70278, and Japanese Unexamined Patent Application, Publication No. 2012-200282).

SUMMARY OF INVENTION

An aspect of the present invention is a microscope pupil relay optical system disposed on an image side of a microscope image-forming optical system including an objective lens, the microscope pupil relay optical system including, in the following order from an object side, a first lens group that has a positive refractive power and to which a convergent light flux is introduced from the object side; and a second lens group that has a positive refractive power, wherein a lens located closest to the object-side end of the first lens group is disposed on the object side of a primary image-forming plane on which the microscope image-forming optical system forms an object image, wherein an exit pupil of the objective lens is re-formed at a position optically conjugate with the exit pupil. According to this aspect, it is possible to shorten the entire length compared with before. The microscope pupil relay optical system may satisfy conditional expression (1) given below:

$$0.5 < fG1/fG2 < 0.9 \qquad (1)$$

where fG1 is a focal length of the first lens group, and fG2 is a focal length of the second lens group.

DESCRIPTION OF EMBODIMENTS

A microscope pupil relay optical system 4 and a microscope device 1 according to an embodiment of the present invention will be described below with reference to the drawings.

Figure 1:
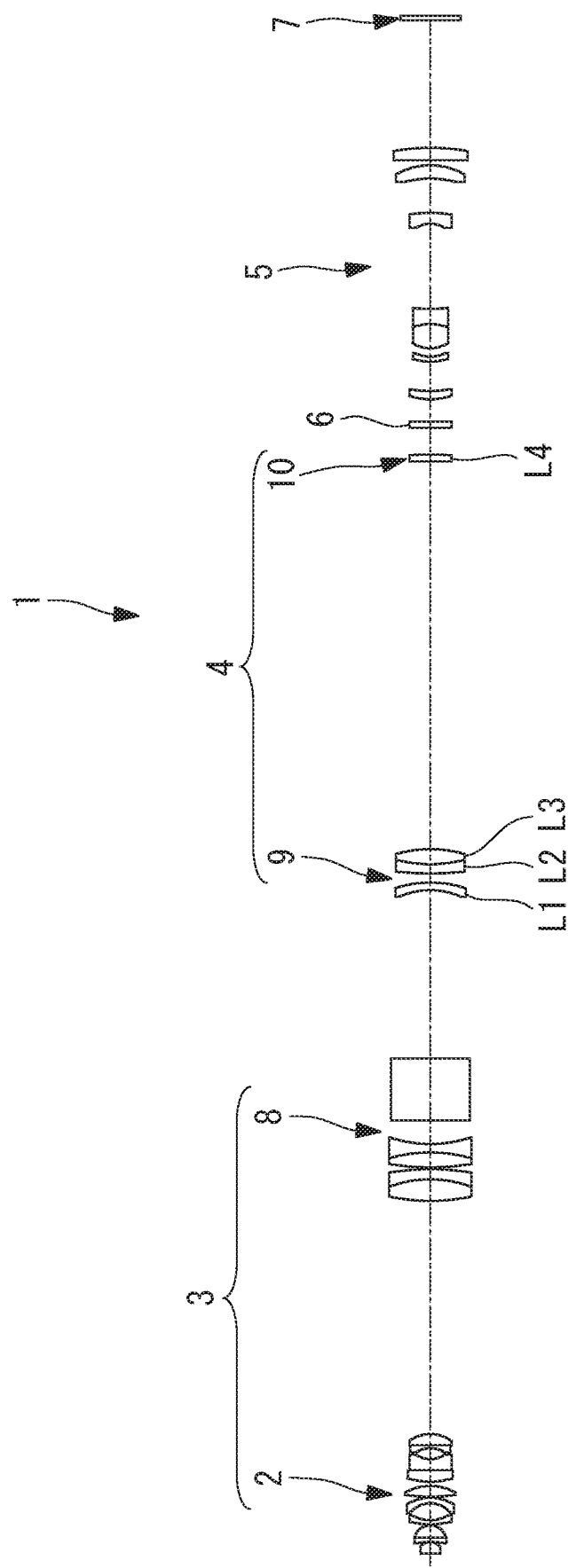
FIG. 1 is a vertical sectional view showing a lens array in a microscope device according to an embodiment of the present invention.

As shown in FIG. 1, the microscope device 1 according to this embodiment includes a microscope image-forming optical system 3 including an infinity-corrected objective lens 2, which collects light from an object; the microscope pupil relay optical system 4 according to this embodiment, which re-forms an exit pupil of the objective lens 2 at an optically conjugate position; a second image-forming lens (secondary image-forming lens) 5 that forms an image from a light flux relayed by the microscope pupil relay optical system 4; a pupil-modulating optical element 6 disposed at the position of the exit pupil re-formed by the microscope pupil relay optical system 4; and a microlens array 7 disposed at the position where an image is formed by the second image-forming lens 5.

The microscope image-forming optical system 3 is an infinity-corrected optical system including the objective lens 2 and an image-forming lens (primary image-forming lens) 8.

A light flux coming from an object being observed, placed on the sample table or the like of the microscope, is collected by the objective lens 2, forming a virtual image at infinity. The light flux from the object, having passed through the objective lens 2, becomes a collimated light flux, and the collimated light flux is focused by the image-forming lens 8 and enters the microscope pupil relay optical system 4 according to this embodiment.

The microscope pupil relay optical system 4 according to this embodiment includes a first lens group 9 having a positive refractive power and a second lens group 10 having a positive refractive power, in that order from the object side.

In the example shown in FIG. 1, the first lens group 9 is constituted of two lenses disposed with a gap therebetween in the optical axis direction. For example, the two lenses are a meniscus lens L1 having a concave face facing the object side and a doublet lens constituted of a meniscus lens L2 having a convex face facing the object side and a biconvex lens L3, in that order from the object side.

The first lens group 9 is disposed on the object side of the primary image-forming plane on which the image-forming lens 8 forms an object image.

The image-forming lens 8 is an image-side telecentric optical system. With this image-forming lens 8, a collimated light flux radiated from the objective lens 2 is focused by the image-forming lens 8 to tentatively form an object image between the first lens group 9 and the second lens group 10 of the microscope pupil relay optical system 4, and the object image is converted into a collimated light flux by the second lens group 10, whereby a virtual image of the exit pupil of the objective lens 2 is formed at infinity.

In the microscope pupil relay optical system 4 according to this embodiment, the following conditional expressions (1), (2), and (3) are satisfied:

$$0.5 < fG1/fG2 < 0.9 \quad (1)$$

$$0.6 < dh12/(fG1+fG2) < 0.8 \quad (2)$$

$$vd2\max > 80 \quad (3)$$

Here, fG1 is a focal length of the first lens group 9, fG2 is a focal length of the second lens group 10, dh12 is a gap between the principal point of the first lens group 9 and the principal point of the second lens group 10, and vd2max is a greatest Abbe number of the lenses in the second lens group 10.

The light flux coming from the object is modulated by the pupil-modulating optical element 6 disposed at the position of the collimated light flux formed by the microscope pupil relay optical system 4 and is then focused by the second image-forming lens 5 to form an object image at the position of the microlens array 7 (secondary image-forming plane).

Light rays coming in different directions from the object, forming an image at the position of the microlens array 7, are introduced to different pixels of an imaging element (not shown) by the individual microlenses 11 constituting the microlens array 7. This makes it possible to capture an image without losing information about the directions of light rays, which makes it possible to acquire three-dimensional information about the object in a short time.

With the thus-configured microscope pupil relay optical system 4 and microscope device 1 according to this embodiment, since the pupil-modulating optical element 6 is disposed at the position of the collimated light flux radiated from the microscope pupil relay optical system 4, slight deviations in the position of the pupil-modulating optical element 6 in the optical axis direction are permitted. Accordingly, an advantage is afforded in that there is no need to precisely set the position of the pupil-modulating optical element 6.

With the microscope pupil relay optical system 4 and the microscope device 1 according to this embodiment, since the microscope image-forming optical system 3 forms an object image between the first lens group 9 and the second lens group 10 constituting the microscope pupil relay optical system 4, it is possible to reduce the entire length. Accordingly, an advantage is afforded in that, even if coded aperture technology and light field technology are applied to an upright microscope, with which the installation space is small, it is possible to configure the entire microscope compactly.

If the lower limit in conditional expression (1) is not met, the first lens group 9 becomes too close to the position where an object image is formed by the image-forming lens 8 itself, which results in an increase in the entire length, and dust adhering to the lens is easily reflected in the image. If the upper limit in conditional expression (1) is exceeded, the first lens group 9 becomes too close to the image-forming lens 8, a beam splitter for coaxial illumination, etc., which hinders the actual disposition. It is possible to prevent the occurrence of these problems by satisfying conditional expression (1).

If the value range in conditional expression (2) is not satisfied, the light flux radiated from the second lens group 10 does not become a collimated light flux, which results in a disadvantage that the magnification changes considerably due to slight deviations in the position where the pupil-modulating optical element 6 is disposed in the optical axis direction. It is possible to prevent the occurrence of this disadvantage by satisfying conditional expression (2).

It is possible to correct chromatic aberration by satisfying conditional expression (3), thereby improving the performance of forming an object image.

In the example described in the context of this embodiment, the first lens group 9 is constituted of the meniscus lens L1 and the doublet lens formed of the two lenses L2 and L3, and the second lens group 10 is constituted of the single lens L4. However, the present invention is not limited to this example. It suffices for the first lens group 9 and the second lens group 10 to have positive refractive powers and to tentatively form an object image therebetween via the microscope image-forming optical system 3.

Although an infinity-corrected optical system has been described as an example of the microscope image-forming optical system 3, a finite-length-corrected optical system may be adopted.

In the infinity-corrected optical system,
conditional expression (1) is preferably:

$0.55 < fG1/fG2 < 0.85$, and conditional expression (2) is preferably:

$0.62 < dh12/(fG1+fG2) < 0.78$.

First Example

A first example of the microscope pupil relay optical system 4 according to this embodiment will be described below with reference to the drawings.

Figure 2:
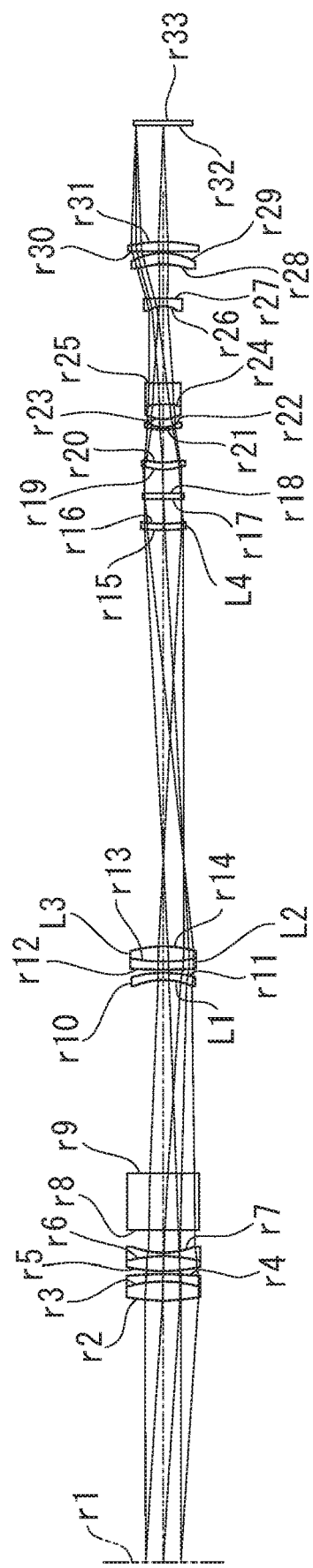
FIG. 2 is a vertical sectional view showing a lens array in a first example of a microscope pupil relay lens included in the microscope device in FIG. 1.

FIG. 2 illustrates the disposition of the microscope pupil relay optical system 4, the image-forming lens 8, the pupil-modulating optical element 6, the second image-forming lens 5, and the microlens array 7 in this example.

The lens data for the optical system in FIG. 2 is given below.

Figure 4A:
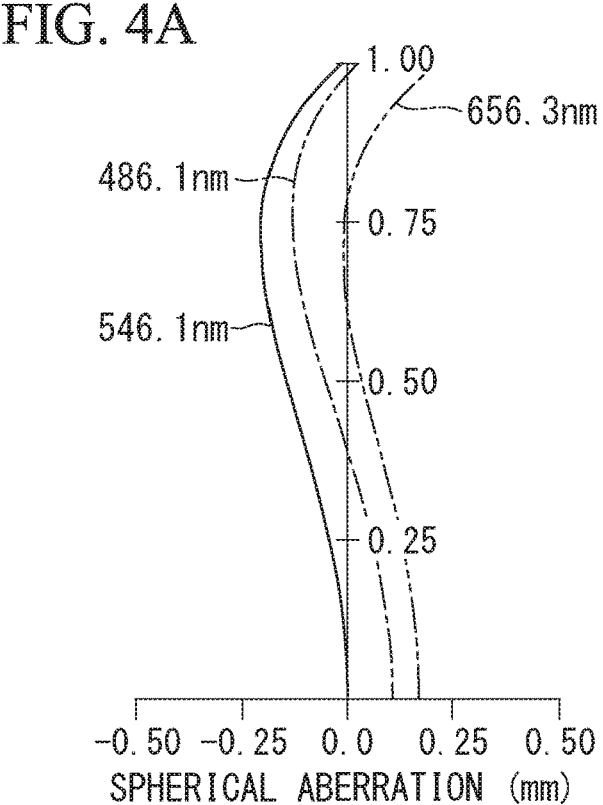
FIG. 4A is a chart showing spherical aberration of an object image formed by the microscope pupil relay lens in FIG. 2.
Figure 4B:
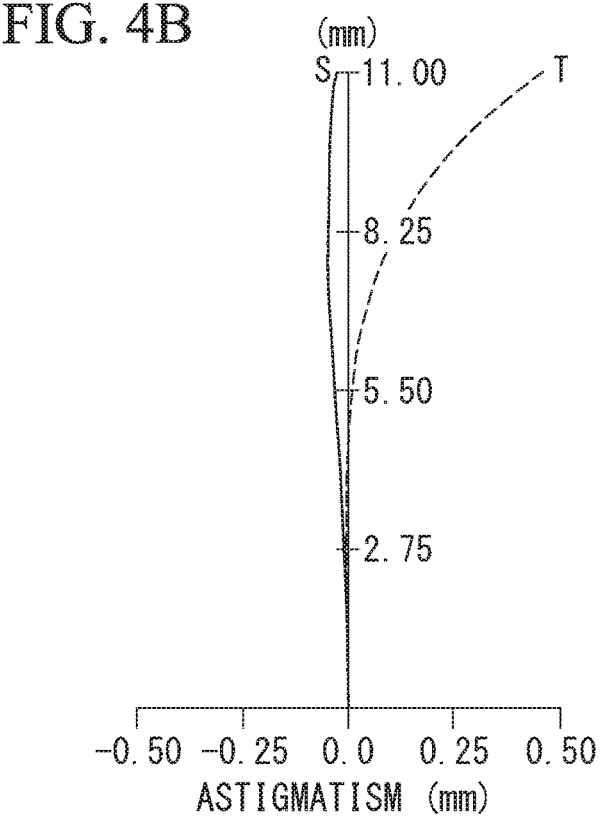
FIG. 4B is a chart showing astigmatism of the object image formed by the microscope pupil relay lens in FIG. 2.
Figure 4C:
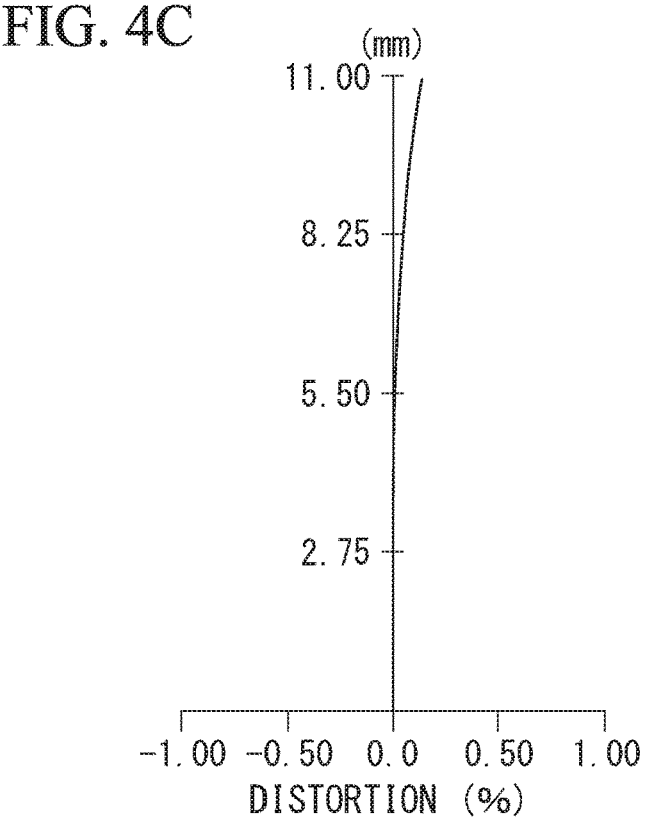
FIG. 4C is a chart showing distortion aberration of the object image formed by the microscope pupil relay lens in FIG. 2.
Figure 5A:
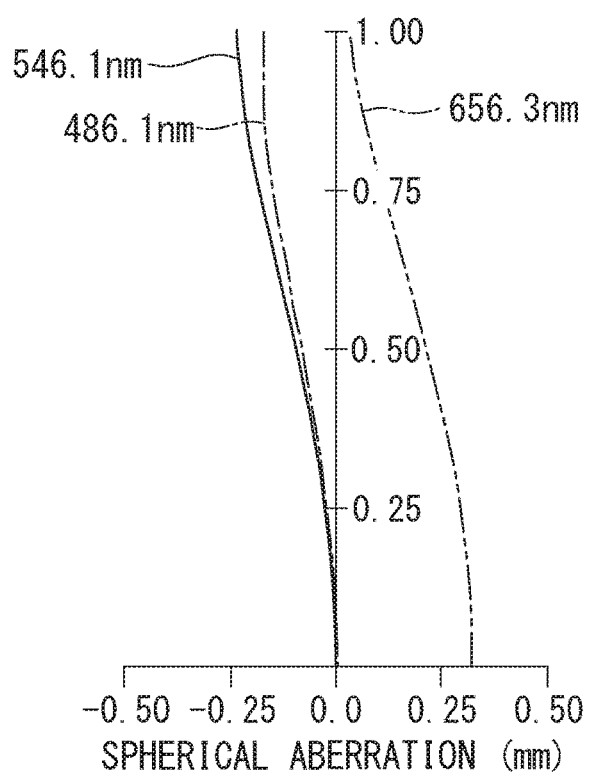
FIG. 5A is a chart showing spherical aberration of a pupil image formed by the microscope pupil relay lens in FIG. 2.
Figure 5B:
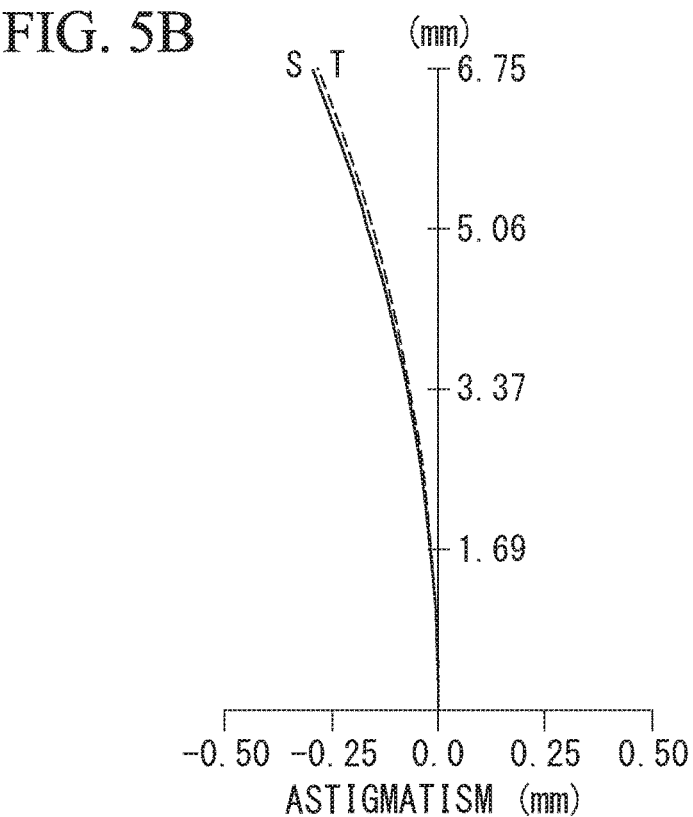
FIG. 5B is a chart showing astigmatism of the pupil image formed by the microscope pupil relay lens in FIG. 2.
Figure 5C:
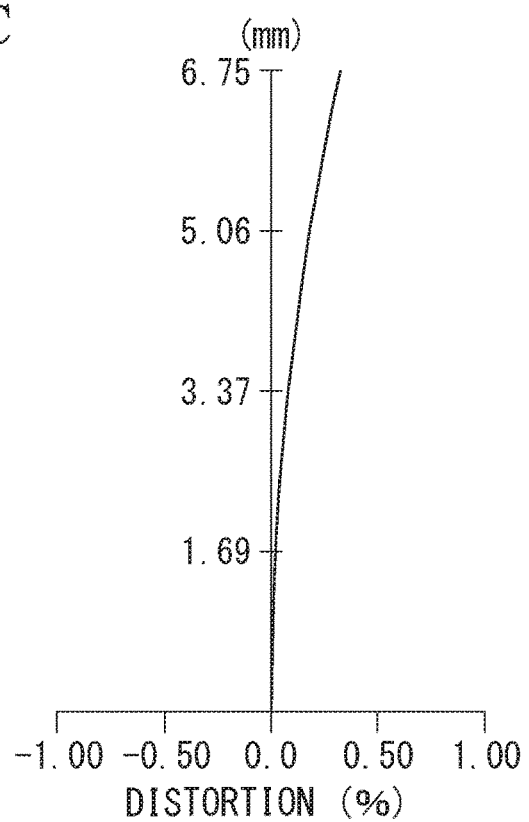
FIG. 5C is a chart showing distortion of the pupil image formed by the microscope pupil relay lens in FIG. 2.

FIGS. 4A, 4B, and 4C show aberrations of the object image in this example, and FIGS. 5A, 5B, and 5C show aberrations of the pupil image in this example.

Here, the primary wavelength is 546.07 nm, and the entrance pupil diameter is 13.5 mm.

| Surface No. | Radius of curvature r | Gap d | nd | vd |
|---|---|---|---|---|
| 1 | ∞ | 107.0000 | | |
| 2 | 70.2797 | 8.2500 | 1.48749 | 70.24 |
| 3 | −46.3398 | 3.0129 | 1.80100 | 34.97 |
| 4 | −133.0073 | 1.0398 | | |
| 5 | 62.4945 | 6.0000 | 1.80100 | 34.97 |
| 6 | −62.6703 | 1.5000 | 1.65412 | 39.68 |
| 7 | 38.1588 | 9.3728 | | |
| 8 | ∞ | 23.000 | 1.51633 | 64.14 |
| 9 | ∞ | 79.1300 | | |
| 10 | −29.1265 | 3.0000 | 1.51633 | 64.14 |
| 11 | −37.7186 | 1.0000 | | |
| 12 | 162.5227 | 3.0000 | 1.63980 | 34.47 |
| 13 | 48.6267 | 6.5000 | 1.51633 | 64.14 |
| 14 | −50.9241 | 170.1219 | | |
| 15 | 51.3286 | 2.6000 | 1.49700 | 81.55 |
| 16 | 215.1066 | 10.0000 | | |
| 17 | ∞ | 2.0000 | 1.51633 | 64.14 |
| 18 | ∞ | 10.0000 | | |
| 19 | 24.2804 | 3.0115 | 1.78472 | 25.68 |
| 20 | 47.9341 | 13.2756 | | |
| 21 | 28.3335 | 1.0272 | 1.63980 | 34.47 |
| 22 | 12.7677 | 3.1345 | | |
| 23 | 13.1581 | 6.4123 | 1.49700 | 81.55 |
| 24 | −20.3492 | 8.3922 | 1.78472 | 25.68 |
| 25 | 61.2789 | 31.4873 | | |
| 26 | −12.1210 | 3.4473 | 1.63980 | 34.47 |
| 27 | −96.9333 | 13.7561 | | |
| 28 | −33.2466 | 4.4938 | 1.78472 | 25.68 |
| 29 | −25.3688 | 0.6925 | | |
| 30 | 9634.5724 | 3.9960 | 1.78472 | 25.68 |
| 31 | −48.5903 | 47.3463 | | |
| 32 | 0.9202 | 1.0000 | 1.458 | 67.7 |
| 33 | ∞ | 1.4522 | | |
| 34 | ∞ | | | |

Surface number 1 corresponds to the exit pupil of the objective lens 2, and surface numbers 2 to 9 correspond to the image-forming lens 8.

Surface numbers 10 to 16 correspond to the microscope pupil relay optical system 4.

The combined focal length of the image-forming lens 8 and the microscope pupil relay optical system 4 is substantially infinite, and the image-forming magnification of the exit pupil of the objective lens 2 is ×1.

L1 to L3 are lenses constituting the first lens group 9 of the microscope pupil relay optical system 4, and L4 is a lense constituting the second lens group 10 of the microscope pupil relay optical system 4.

At the position of surface number 17, the pupil of the objective lens 2 is formed.

Surface numbers 17 and 18 correspond to the pupil-modulating optical element 6.

Surface numbers 19 to 31 correspond to the second image-forming lens 5. The focal length thereof is 180 mm, and the image height is 11 mm.

Surface numbers 32 and 33 correspond to the microlens array 7.

The vertical and horizontal pitches of the microlens array 7 are both 0.045 mm, and the dimensions thereof in a plane perpendicular to the optical axis thereof are 17.6 mm×13.2 mm.

Surface number 34 corresponds to the light-receiving face of the imaging element. The pixel pitch of the imaging element is 5 μm. That is, 9×9=81 pixels correspond to each of the microlenses 11.

The focal length of each of the microlenses 11 of the microlens array 7 is 1.2 mm.

Figure 3A:
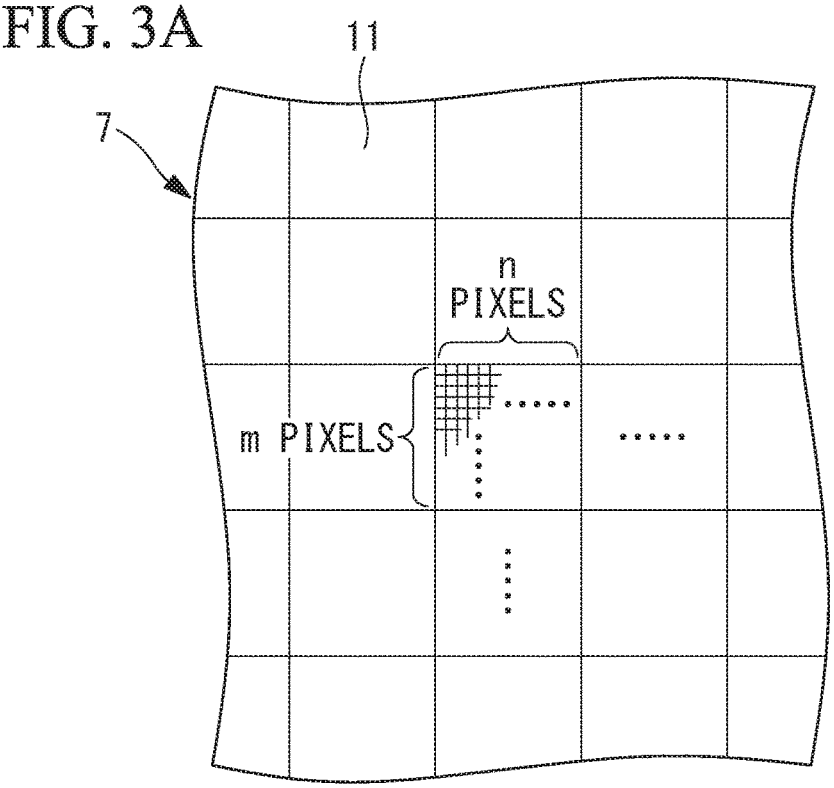
FIG. 3A is a front view showing the relationship between a microlens array and the pixels of a monochrome imaging element.
Figure 3B:
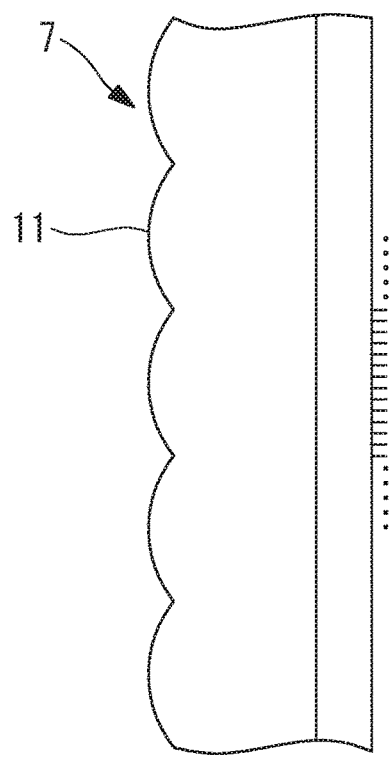
FIG. 3B is a vertical sectional view of FIG. 3A.

FIGS. 3A and 3B show the relationship between the microlenses 11 and the imaging element. The imaging element is a monochrome imaging element. This makes it possible to acquire a light field image by using the microscope. In the case where a color image is to be acquired, wavelength bands corresponding to the individual colors of RGB should be used as illumination light, and individual images captured with illumination in the individual wavelength bands should be combined together.

The focal length fG1 of the first lens group 9 and the focal length fG2 of the second lens group 10 are:

$fG1 = 109.5$ mm $fG2 = 135.9$ mm

Thus, $fG1/fG2 = 0.81$ which satisfies conditional expression (1).

The gap dh12 between the primary points of the first lens group 9 and the second lens group 10 is:

$dh12 = 175.64$ mm

Furthermore, $fG1 + fG2 = 245.4$ mm

Thus, $dh12/(fG1+fG2) = 0.72$ which satisfies conditional expression (2).

The Abbe number of the lenses L7 and L8, having the highest Abbe number among the lenses of the second lens group 10, is 81.55, which satisfies conditional expression (3).

Second Example

Next, a second example of the microscope pupil relay optical system 4 according to this embodiment will be described below with reference to the drawings.

Figure 6:
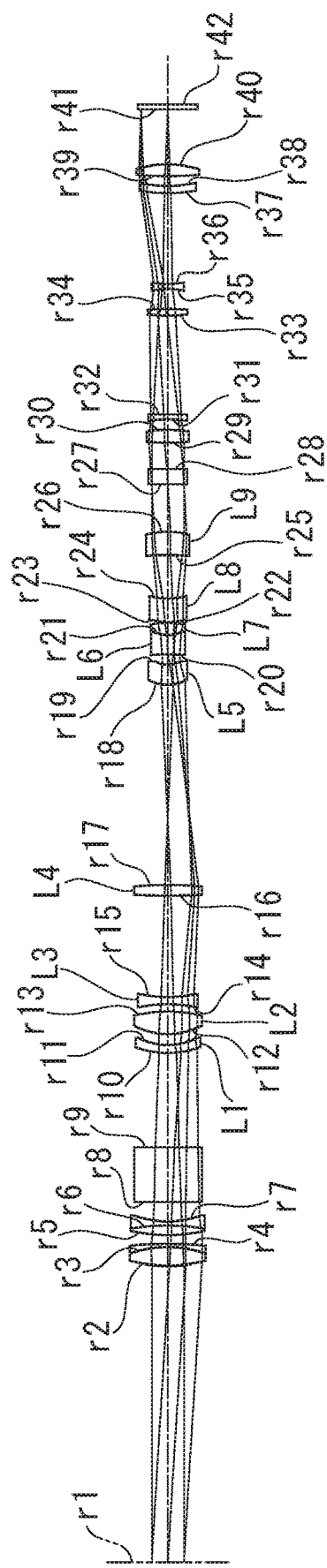
FIG. 6 is a vertical sectional view showing a lens array in a second example of the microscope pupil relay lens included in the microscope device in FIG. 1.

FIG. 6 illustrates the disposition of the microscope pupil relay optical system 4, the image-forming lens 8, the pupil-modulating optical element 6, the second image-forming lens 5, and the microlens array 7 in this example.

The lens data for the optical system in FIG. 6 is given below.

Figure 8A:
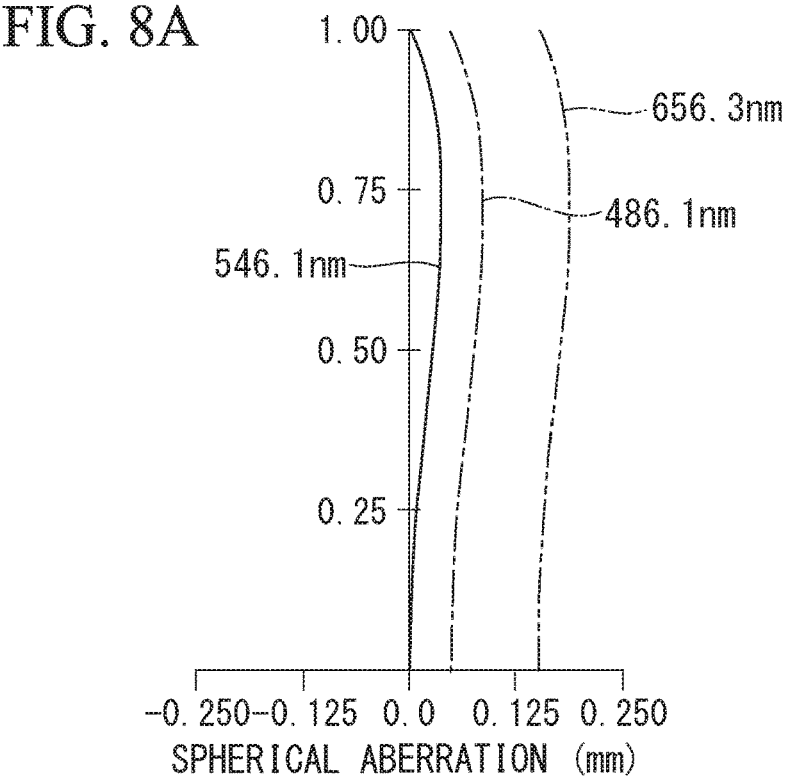
FIG. 8A is a chart showing spherical aberration of an object image formed by the microscope pupil relay lens in FIG. 6.
Figure 8B:
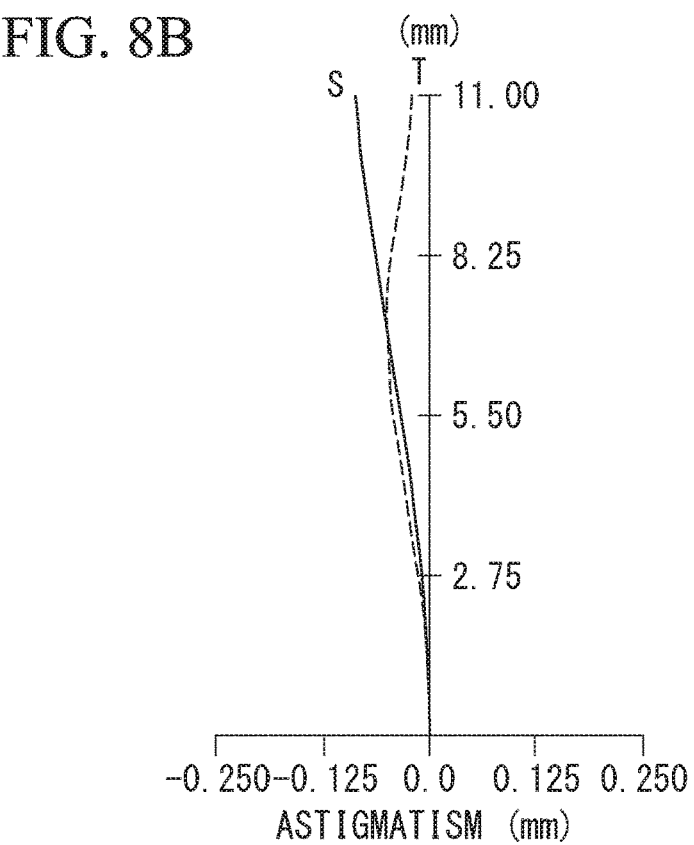
FIG. 8B is a chart showing astigmatism of the object image formed by the microscope pupil relay lens in FIG. 6.
Figure 8C:
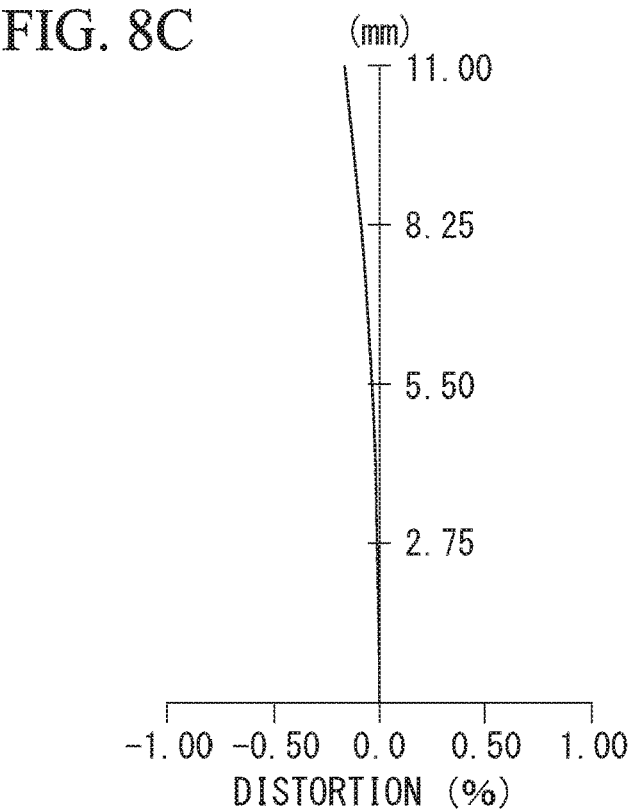
FIG. 8C is a chart showing distortion of the object image formed by the microscope pupil relay lens in FIG. 6.
Figure 9A:
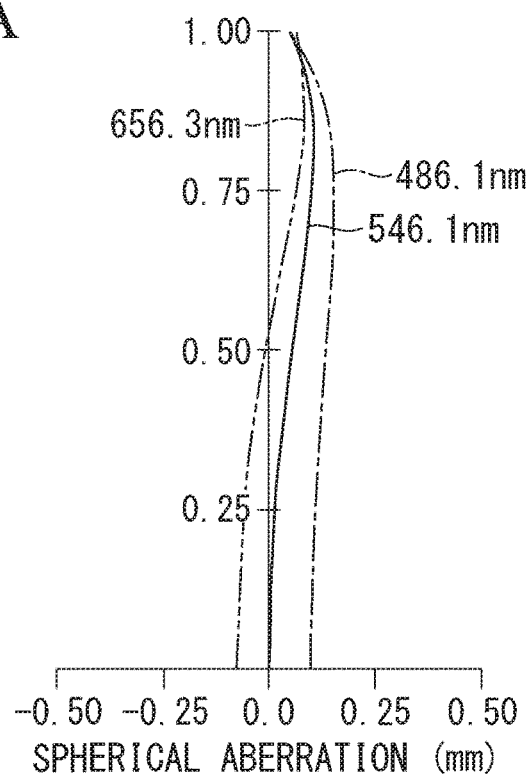
FIG. 9A is a chart showing spherical aberration of a pupil image formed by the microscope pupil relay lens in FIG. 6.
Figure 9B:
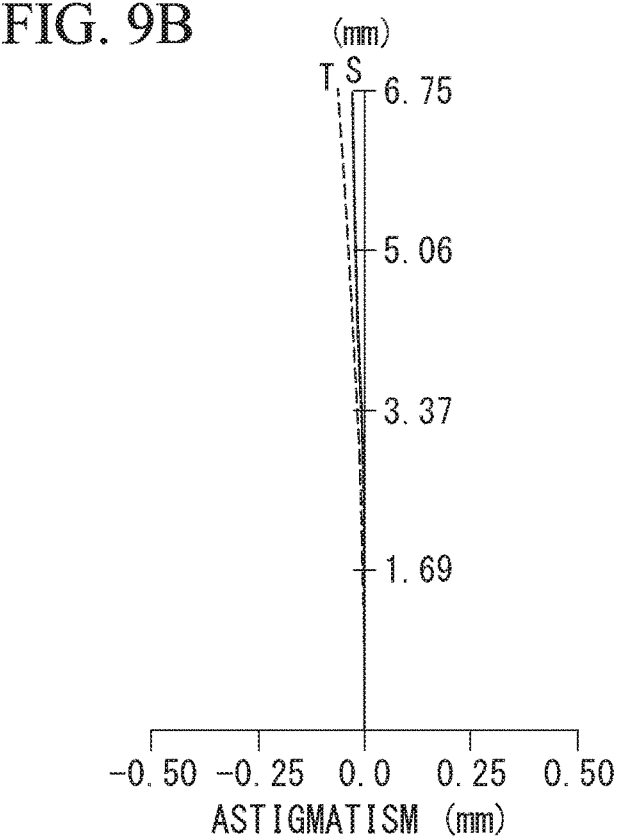
FIG. 9B is a chart showing astigmatism of the pupil image formed by the microscope pupil relay lens in FIG. 6.
Figure 9C:
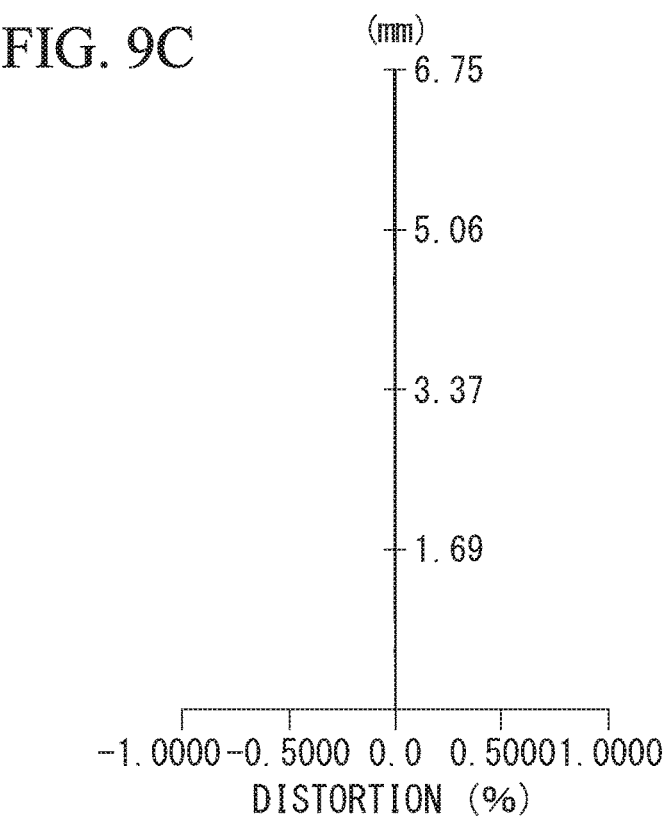
FIG. 9C is a chart showing distortion of the pupil image formed by the microscope pupil relay lens in FIG. 6.

FIGS. 8A, 8B, and 8C show aberrations of the object image in this example, and FIGS. 9A, 9B, and 9C show aberrations of the pupil image in this example.

Here, the primary wavelength is 546.07 nm, and the entrance pupil diameter is 13.5 mm.

| Surface No. | Radius of curvature r | Gap d | nd | vd |
|---|---|---|---|---|
| 1 | ∞ | 125.7700 | | |
| 2 | 61.7717 | 8.0000 | 1.48749 | 70.24 |
| 3 | −46.7738 | 1.2000 | 1.80100 | 34.97 |
| 4 | −139.3052 | 3.6367 | | |
| 5 | 66.2221 | 4.4630 | 1.80100 | 34.97 |
| 6 | −66.2221 | 1.2000 | 1.64450 | 40.82 |
| 7 | 38.0108 | 8.7000 | | |
| 8 | ∞ | 23.0000 | 1.51633 | 64.14 |
| 9 | ∞ | 40.0000 | | |
| 10 | 41.0478 | 3.0000 | 1.68893 | 31.08 |
| 11 | 23.9637 | 4.9800 | | |
| 12 | 27.9811 | 9.0000 | 1.49700 | 81.55 |
| 13 | −48.3897 | 3.4400 | | |
| 14 | −59.7355 | 3.0000 | 1.68893 | 31.08 |
| 15 | 59.7355 | 42.7700 | | |
| 16 | 178.9415 | 4.5000 | 1.80518 | 25.43 |
| 17 | −100.5222 | 84.4200 | | |
| 18 | 15.7517 | 8.8000 | 1.68893 | 31.08 |
| 19 | 12.2838 | 4.5400 | | |
| 20 | −23.8413 | 7.9000 | 1.80518 | 25.43 |
| 21 | 16.8959 | 5.2400 | 1.49700 | 81.55 |
| 22 | −27.3464 | 0.2200 | | |
| 23 | 22.8104 | 10.0000 | 1.49700 | 81.55 |
| 24 | 39.6290 | 18.1800 | | |
| 25 | −110.4627 | 10.0000 | 1.80518 | 25.43 |
| 26 | −38.4406 | 20.0000 | | |
| 27 | ∞ | 6.2500 | 1.56384 | 60.67 |
| 28 | ∞ | 11.0000 | | |
| 29 | 35.0232 | 5.5000 | 1.49700 | 81.55 |
| 30 | −64.8748 | 4.5000 | | |
| 31 | −50.5176 | 2.0000 | 1.80100 | 34.97 |
| 32 | ∞ | 41.9890 | | |
| 33 | 62.6438 | 3.0000 | 1.80518 | 25.43 |
| 34 | −77.4269 | 8.3202 | | |
| 35 | −26.9630 | 2.0000 | 1.80100 | 34.97 |
| 36 | 40.7950 | 38.5908 | | |
| 37 | 88.3639 | 2.8000 | 1.80518 | 25.43 |
| 38 | 57.3177 | 4.3000 | | |
| 39 | 121.5478 | 5.0000 | 1.49700 | 81.55 |
| 40 | −35.0232 | 22.9000 | | |
| 41 | 0.5502 | 0.8000 | 1.458 | 67.7 |
| 42 | ∞ | 0.6515 | | |
| 43 | ∞ | | | |

Surface number 1 corresponds to the exit pupil of the objective lens 2, and surface numbers 2 to 9 correspond to the image-forming lens 8.

Surface numbers 10 to 26 correspond to the microscope pupil relay optical system 4.

L1 to L4 are lenses constituting the first lens group 9 of the microscope pupil relay optical system 4, and L5 to L9 are lenses constituting the second lens group 10 of the microscope pupil relay optical system 4.

At the position of surface number 27, the pupil of the objective lens 2 is formed by the microscope pupil relay optical system 4.

Surface numbers 27 and 28 correspond to the pupil-modulating optical element 6.

Surface numbers 29 to 40 correspond to the second image-forming lens 5. The focal length thereof is 180 mm, and the image height is 11 mm.

Surface numbers 41 and 42 correspond to the microlens array 7.

The vertical and horizontal pitches of the microlens array 7 are both 0.045 mm, and the dimensions thereof in a plane perpendicular to the optical axis thereof are 17.6 mm×13.2 mm.

Surface number 43 corresponds to the light-receiving face of the imaging element. The pixel pitch of the imaging element is 5 µm. That is, 9×9=81 pixels correspond to each of the microlenses 11.

The focal length of each of the microlenses 11 of the microlens array 7 is 1.2 mm.

Figure 7A:
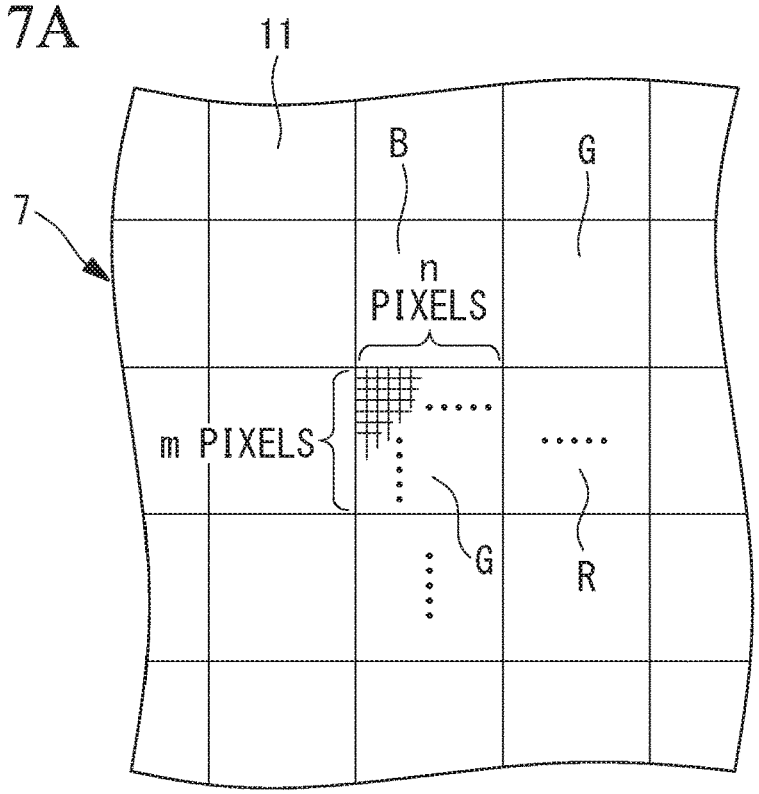
FIG. 7A is a front view showing the relationship between the microlens array and the pixels of a color imaging element.
Figure 7B:
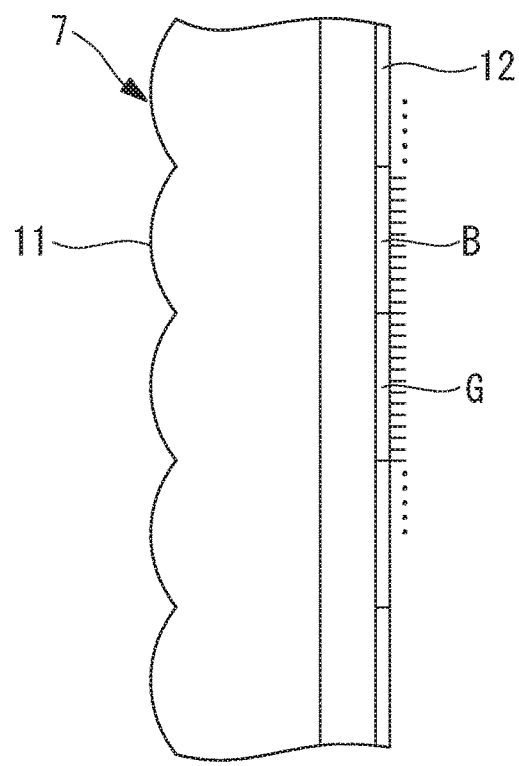
FIG. 7B is a vertical sectional view of FIG. 7A.

As shown in FIGS. 7A and 7B, at the 9×9 pixels corresponding to each of the microlenses 11, a color filter 12 for one of the RGB colors is disposed on the imaging element. This makes it possible to acquire a light field color image.

The focal length fG1 of the first lens group 9 and the focal length fG2 of the second lens group 10 are:

$fG1=104.11$ mm $fG2=150.10$ mm

Thus, $fG1/fG2=0.69$ which satisfies conditional expression (1).

The gap dh12 between the primary points of the first lens group 9 and the second lens group 10 is:

$dh12=167.33$ mm

Furthermore, $fG1+fG2=254.21$ mm

Thus, $dh12/(fG1+fG2)=0.66$ which satisfies conditional expression (2).

The Abbe number of the lens L4, having the highest Abbe number among the lenses of the second lens group 10, is 81.55, which satisfies conditional expression (3).

Third Example

Next, a third example of the microscope pupil relay optical system 4 according to this embodiment will be described below with reference to the drawings.

Figure 10:
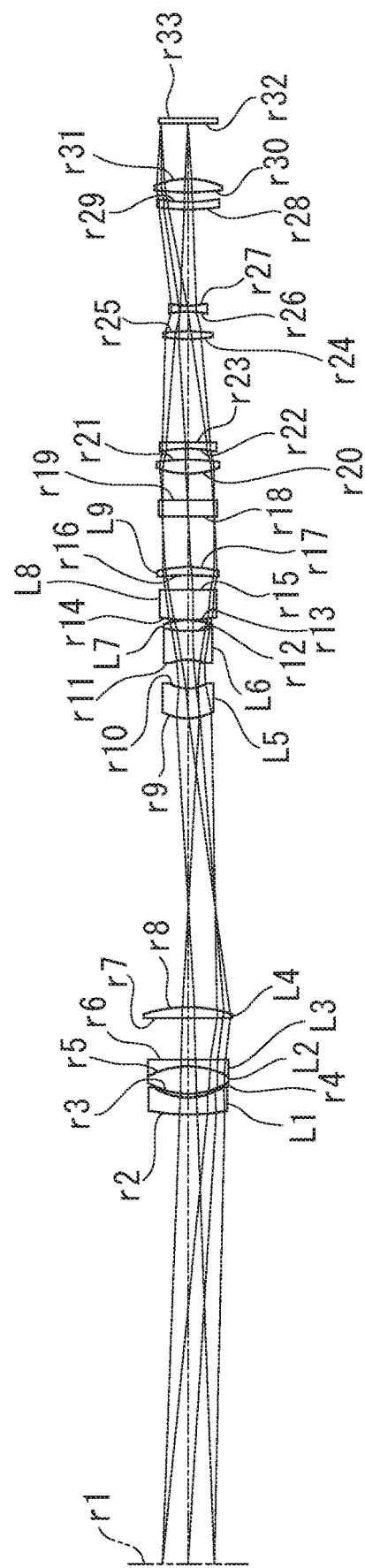
FIG. 10 is a vertical sectional view showing a lens array in a third example of the microscope pupil relay lens included in the microscope device in FIG. 1.

FIG. 10 illustrates the disposition of the microscope pupil relay optical system 4, the pupil-modulating optical element 6, the image-forming lens 8, and the microlens array 7 in this example.

In this example, a light flux coming from an object, collected by the objective lens 2 of a finite-system microscope, is introduced to the microscope pupil relay optical system 4 before the point at which an object image is formed, without the intervention of the image-forming lens 8.

The lens data for the optical system in FIG. 10 is given below.

Figure 11A:
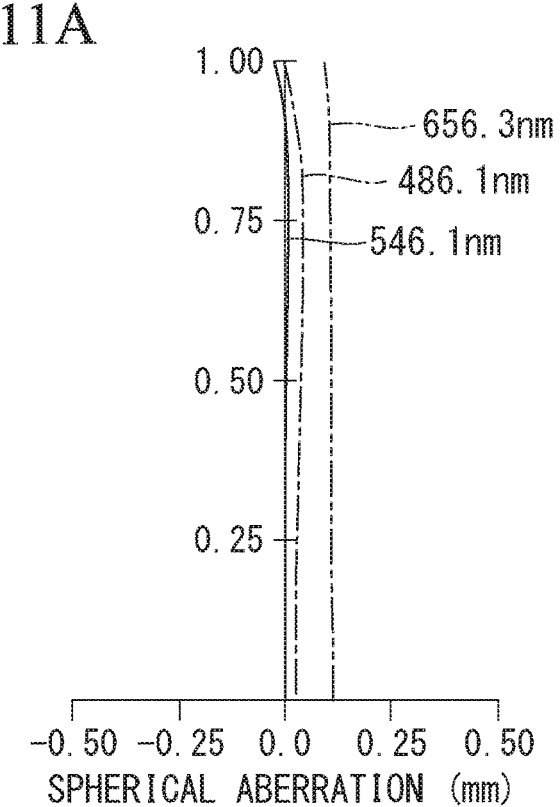
FIG. 11A is a chart showing spherical aberration of an object image formed by the microscope pupil relay lens in FIG. 10.
Figure 11B:
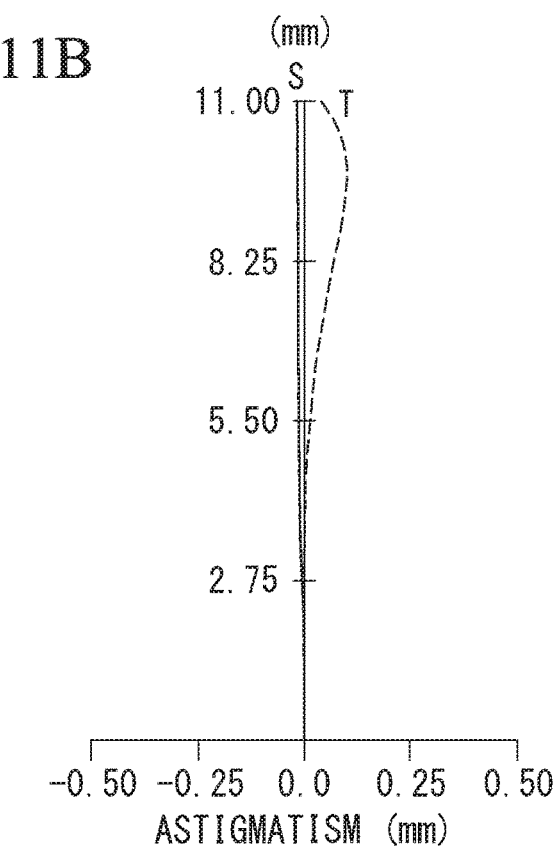
FIG. 11B is a chart showing astigmatism of the object image formed by the microscope pupil relay lens in FIG. 10.
Figure 11C:
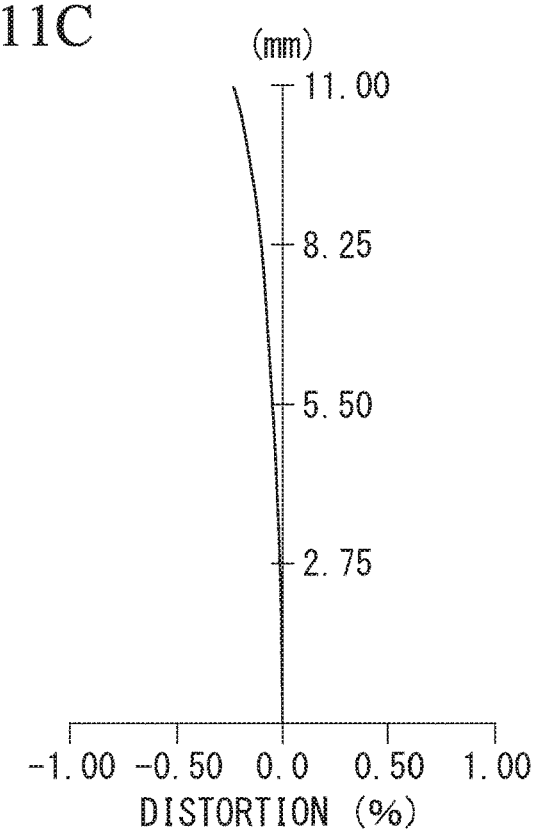
FIG. 11C is a chart showing distortion of the object image formed by the microscope pupil relay lens in FIG. 10.
Figure 12A:
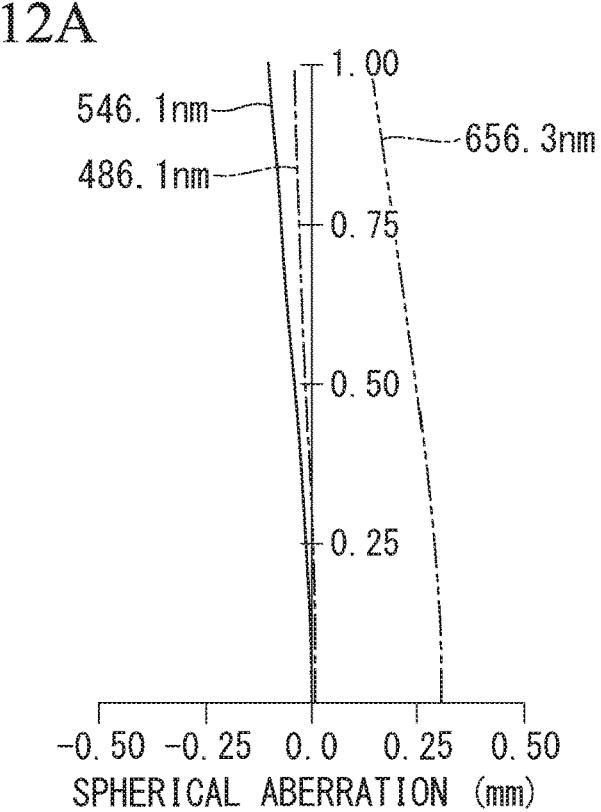
FIG. 12A is a chart showing spherical aberration of a pupil image formed by the microscope pupil relay lens in FIG. 10.
Figure 12B:
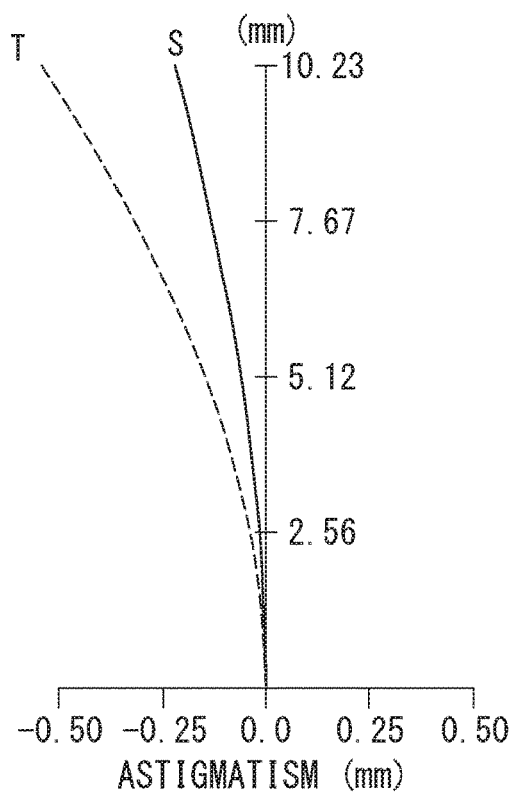
FIG. 12B is a chart showing astigmatism of the pupil image formed by the microscope pupil relay lens in FIG. 10.
Figure 12C:
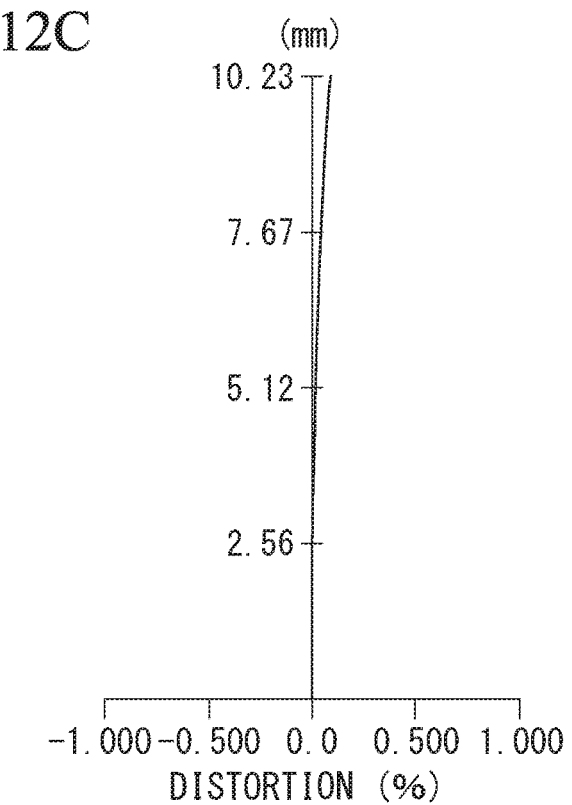
FIG. 12C is a chart showing distortion of the pupil image formed by the microscope pupil relay lens in FIG. 10.

FIGS. 11A, 11B, and 11C show aberrations of the object image in this example, and FIGS. 12A, 12B, and 12C show aberrations of the pupil image in this example.

Here, the primary wavelength is 546.07 nm, and the entrance pupil diameter is 20.46 mm.

| Surface No. | Radius of curvature r | Gap d | nd | vd |
| --- | --- | --- | --- | --- |
| 1 | ∞ | 180.0000 | | |
| 2 | 76.9808 | 7.0000 | 1.68893 | 31.08 |
| 3 | 27.6536 | 1.5072 | | |
| 4 | 29.0431 | 11.0000 | 1.49700 | 81.55 |

-continued

| Surface No. | Radius of curvature r | Gap d | nd | vd |
| --- | --- | --- | --- | --- |
| 5 | −32.9997 | 2.5000 | 1.68893 | 31.08 |
| 6 | −92.8698 | 16.4761 | | |
| 7 | ∞ | 4.3704 | 1.80518 | 25.43 |
| 8 | −59.6493 | 116.2472 | | |
| 9 | 22.6263 | 12.0000 | 1.68893 | 31.08 |
| 10 | 18.1010 | 11.5285 | | |
| 11 | −20.8339 | 11.3423 | 1.80518 | 25.43 |
| 12 | 33.6167 | 4.2808 | 1.43875 | 94.95 |
| 13 | −33.6167 | 0.2000 | | |
| 14 | 52.2573 | 12.0000 | 1.43875 | 94.95 |
| 15 | 1830.5649 | 6.1144 | | |
| 16 | −189.8306 | 3.4331 | 1.80518 | 25.43 |
| 17 | −38.9492 | 20.0379 | | |
| 18 | ∞ | 6.2500 | 1.56384 | 60.67 |
| 19 | ∞ | 11.0000 | | |
| 20 | 35.0232 | 5.5000 | 1.49700 | 81.55 |
| 21 | −64.8748 | 4.5000 | | |
| 22 | −50.5176 | 2.0000 | 1.80100 | 34.97 |
| 23 | ∞ | 41.9890 | | |
| 24 | 62.6438 | 3.0000 | 1.80518 | 25.43 |
| 25 | −77.4269 | 8.3202 | | |
| 26 | −26.9630 | 2.0000 | 1.80100 | 34.97 |
| 27 | 40.7950 | 38.5908 | | |
| 28 | 88.3639 | 2.8000 | 1.80518 | 25.43 |
| 29 | 57.3177 | 4.3000 | | |
| 30 | 121.5478 | 5.0000 | 1.49700 | 81.55 |
| 31 | −35.0232 | 23.0000 | | |
| 32 | 0.5502 | 0.8000 | 1.458 | 67.7 |
| 33 | ∞ | 0.6515 | | |
| 34 | ∞ | | | |

Surface number 1 corresponds to the exit pupil of the objective lens 2, and surface numbers 2 to 17 correspond to the microscope pupil relay optical system 4.

L1 to L4 are lenses constituting the first lens group 9 of the microscope pupil relay optical system 4, and L5 to L9 are lenses constituting the second lens group 10 of the microscope pupil relay optical system 4.

At the position of surface number 18, the pupil of the objective lens 2 is formed by the microscope pupil relay optical system 4.

Surface numbers 18 and 19 correspond to the pupil-modulating optical element 6.

Surface numbers 20 to 31 correspond to the image-forming lens 8. The focal length thereof is 180 mm, and the image height is 11 mm.

Surface numbers 32 and 33 correspond to the microlens array 7.

The vertical and horizontal pitches of the microlens array 7 are both 0.045 mm, and the dimensions thereof in a plane perpendicular to the optical axis thereof are 17.6 mm×13.2 mm.

Surface number 34 corresponds to the light-receiving face of the imaging element. The pixel pitch of the imaging element is 5 µm. That is, 9×9=81 pixels correspond to each of the microlenses 11.

The focal length of each of the microlenses 11 of the microlens array 7 is 1.2 mm.

As shown in FIGS. 7A and 7B, at the 9×9 pixels corresponding to each of the microlenses 11, a color filter 12 for one of the RGB colors is disposed on the imaging element. This makes it possible to acquire a light field color image.

The focal length fG1 of the first lens group 9 and the focal length fG2 of the second lens group 10 are:

$fG1=96.54$ mm $fG2=174.26$ mm

Thus, $fG1/fG2=0.55$ which satisfies conditional expression (1).

The gap dh12 between the primary points of the first lens group 9 and the second lens group 10 is:

$dh12=209.10$ mm

Furthermore, $fG1+fG2=270.80$ mm

Thus, $dh12/(fG1+fG2)=0.77$ which satisfies conditional expression (2).

The Abbe number of the lenses L7 and L8, having the highest Abbe number among the lenses of the second lens group 10, is 94.95, which satisfies conditional expression (3).

Table 1 shows the values in the conditional expressions in the individual examples.

TABLE 1

| Conditional | | | Example No. | | |
|---|---|---|---|---|---|
| expression | | Value | 1 | 2 | 3 |
| (1) | 0.55 < fG1/fG2 < 0.85 | fG1/fG2 | 0.81 | 0.69 | 0.55 |
| (2) | 0.62 < dh12/(fG1 + fG2) < 0.78 | dh12/(fG1 + fG2) | 0.72 | 0.66 | 0.77 |
| (3) | vdmax >80 | vdmax | 81.55 | 81.55 | 94.95 |

As a result, the following aspect is read by the above described embodiment of the present invention.

An aspect of the present invention is a microscope pupil relay optical system disposed on an image side of a microscope image-forming optical system including an objective lens, the microscope pupil relay optical system including, in the following order from an object side, a first lens group that has a positive refractive power and to which a convergent light flux is introduced from the object side; and a second lens group that has a positive refractive power, wherein a lens located closest to the object-side end of the first lens group is disposed on the object side of a primary image-forming plane on which the microscope image-forming optical system forms an object image, wherein an exit pupil of the objective lens is re-formed at a position optically conjugate with the exit pupil. According to this aspect, it is possible to shorten the entire length compared with before. The microscope pupil relay optical system may satisfy conditional expression (1) given below:

$$0.5 < fG1/fG2 < 0.9 \quad (1)$$

where fG1 is a focal length of the first lens group, and fG2 is a focal length of the second lens group.

In the above aspect, the microscope image-forming optical system may be an infinity-corrected microscope optical system including the objective lens and a primary image-forming lens that is configured to form an image by using a light flux passed through the objective lens, and the primary image-forming lens may form the object image on the primary image-forming plane.

If the lower limit in conditional expression (1) is not met, the first lens group becomes too close to the position where an object image is formed by the image-forming lens itself, which results in an increase in the entire length, and dust adhering to the lens is easily reflected in the image. If the upper limit in conditional expression (1) is exceeded, the first lens group becomes too close to the image-forming lens, a beam splitter for coaxial illumination, etc., which hinders the actual disposition.

In the above aspect, conditional expression (2) given below may be satisfied:

$$0.6 < dh12/(fG1+fG2) < 0.8 \quad (2)$$

where fG1 is a focal length of the first lens group, fG2 is a focal length of the second lens group, and dh12 is a gap between adjacent primary points of the first lens group and the second lens group.

In this case, by satisfying conditional expression (2), it is possible to collimate the light flux radiated from the microscope pupil relay optical system. This makes it possible to prevent variations in the magnification without having to precisely set the position of the pupil-modulating optical element in the optical axis direction.

In the above aspect, conditional expression (3) given below may be satisfied:

$$vd2max > 80 \quad (3)$$

where vd2max is a greatest Abbe number among the Abbe numbers of the lenses included in the second lens group.

In this case, by satisfying conditional expression (3), it is possible to correct color aberration of the object light flux, thereby improving the object-image forming performance.

Another aspect of the present invention is a microscope device including any one of the above microscope pupil relay optical systems; the microscope image-forming optical system that is disposed on the object side of the microscope pupil relay optical system, that includes the objective lens, and that is configured to form an object image; and a secondary image-forming lens that is configred to form an image on a secondary image-forming plane by using a light flux relayed from the microscope image-forming optical system by the microscope pupil relay optical system.

REFERENCE SIGNS LIST

1 Microscope device
2 Objective lens
3 Microscope image-forming optical system
4 Microscope pupil relay optical system
5 Second image-forming lens (Secondary image-forming lens)
8 Image-forming lens (primary image-forming lens)
9 First lens group
10 Second lens group

The invention claimed is:

1. A microscope device comprising:
   an infinity-corrected microscope optical system comprising:
      an objective lens; and
      a primary image-forming lens that is configured to form an image by using a light flux that has passed through the objective lens;
   a microscope pupil relay optical system disposed on an image side of the infinity-corrected microscope optical system, the microscope pupil relay optical system comprising, in the following order from an object side:
      a first lens group that has a positive refractive power and to which a convergent light flux is introduced from the object side; and a second lens group that has a positive refractive power;

a secondary image-forming lens that is configured to form an image on a secondary image-forming plane by using a light flux relayed from the infinity-corrected microscope optical system by the microscope pupil relay optical system; and a pupil-modulating optical element disposed on an image side of the microscope pupil relay optical system, wherein:

a lens located closest to the object side from among lenses of the first lens group is disposed on the object side of a primary image-forming plane on which the primary image-forming lens forms an object image, the microscope pupil relay optical system re-forms an exit pupil of the objective lens at a position optically conjugate with the exit pupil, the pupil-modulating element is disposed at a position of the exit pupil re-formed by the microscope pupil relay optical system, and the microscope pupil relay optical system satisfies the conditional expression given below:

$$0.5 < fG1/fG2 < 0.9$$

where $fG1$ is a focal length of the first lens group, and $fG2$ is a focal length of the second lens group.

2. The microscope device according to claim 1, further satisfying the conditional expression given below:

$$0.6 < dh12/(fG1+fG2) < 0.8$$

where $dh12$ is a gap between adjacent primary points of the first lens group and the second lens group.

3. The microscope pupil relay optical system device according to claim 1, further satisfying the conditional expression given below:

$$vd2max > 80$$

where $vd2Max$ is a greatest Abbe number among Abbe numbers of the lenses included in the second lens group.

4. The microscope device according to claim 1, further comprising a microlens array disposed at a position at which the image is formed by the secondary image-forming lens.

* * * * *